United States Patent
Fried et al.

(10) Patent No.: US 8,401,544 B2
(45) Date of Patent: Mar. 19, 2013

(54) METHOD OF DETERMINING THE ACTIVE SET IN A CELLULAR RADIO SYSTEM

(75) Inventors: Tomas Fried, Bromma (SE); Fredrik Gunnarsson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 384 days.

(21) Appl. No.: 12/676,463

(22) PCT Filed: Sep. 11, 2007

(86) PCT No.: PCT/SE2007/050647
§ 371 (c)(1),
(2), (4) Date: Mar. 4, 2010

(87) PCT Pub. No.: WO2009/035386
PCT Pub. Date: Mar. 19, 2009

(65) Prior Publication Data
US 2010/0216456 A1    Aug. 26, 2010

(51) Int. Cl.
H04W 24/00 (2009.01)
H04W 36/00 (2009.01)
H04M 3/00 (2006.01)

(52) U.S. Cl. ........ 455/425; 455/423; 455/418; 455/437; 455/442; 455/436; 370/338

(58) Field of Classification Search ............. 455/425
See application file for complete search history.

(56) References Cited

U.S. PATENT DOCUMENTS

| | | | |
|---|---|---|---|
| 6,442,389 B1 * | 8/2002 | Marcum | 455/437 |
| 6,445,917 B1 * | 9/2002 | Bark et al. | 455/423 |
| 2004/0032845 A1 | 2/2004 | Chen | |
| 2005/0186957 A1 * | 8/2005 | Sako et al. | 455/423 |
| 2008/0096566 A1 * | 4/2008 | Brunner et al. | 455/437 |
| 2008/0207186 A1 * | 8/2008 | Kawamoto et al. | 455/418 |
| 2009/0275337 A1 * | 11/2009 | Maeda et al. | 455/442 |
| 2012/0021745 A1 | 1/2012 | Tu | |

FOREIGN PATENT DOCUMENTS

| | | |
|---|---|---|
| CN | 1878419 A1 | 12/2006 |
| EP | 1 499 147 A1 | 1/2005 |
| EP | 1 662 729 A1 | 5/2006 |
| EP | 1 802 161 A1 | 6/2007 |
| WO | WO 03/045104 A1 | 5/2003 |
| WO | WO 2008/006278 A1 | 1/2008 |

OTHER PUBLICATIONS

3GPP TS 25.331 version 6.10.0 Release 6 Universal Mobile Telecommunication System (UMTS); Radion Resource Control (RRC); V 6.10.0 (Jun. 2006).*
3GPP TS 25.331 version 6.14.0 Release 6 Universal Mobile Telecommunication System (UMTS); Radion Resource Control (RRC); V 6.14.0 (Jun. 2007).*
International Search Report dated Jul. 4, 2008 (4 pages).
First Office Action with English language translation, CN 200780100626.8—Apr. 23, 2012.

* cited by examiner

*Primary Examiner* — Wayne Cai
*Assistant Examiner* — Timothy Pham
(74) *Attorney, Agent, or Firm* — Myers Bigel Sibley & Sajovec, P.A.

(57) ABSTRACT

In a method and a device for determining an active set for a mobile station cell individual offsets (CIO) is determined for a number of cells. The offsets are signaling to the mobile station, which adds corrections to the reference signal measurements based on the cell individual offsets (CIO), thereby forming a corrected reference signal measurement and the active set based on the corrected reference signal measurement.

14 Claims, 3 Drawing Sheets

METHOD OF DETERMINING THE ACTIVE SET IN A CELLULAR RADIO SYSTEM

TECHNICAL FIELD

The present invention relates to a method and a device for determining the active set in a cellular radio system.

BACKGROUND

One key feature in the Wideband Code Division Multiple Access (WCDMA) standard is the ability to simultaneously establish links to multiple cells. This is feature is commonly referred to as soft handover when the cells are located at different sites, softer handover when the cells are located at the same site or macro diversity etc. The set of cells that a mobile station which may be termed User Equipment (UE) is connected to is commonly denoted the active set.

The WCDMA active set is formed based on measurement reports from the User Equipments (UEs). These measurements are performed on a reference signal for each cell. The reference signal is a signal used for measurements and which may also be used for synchronization. In the case of WCDMA, the Common Pilot Channel (CPICH) is used. For all relevant cells, the channel quality/channel condition, such as the received quality or strength is determined. IN the case of WCDMA the measured Ec/No (chip power relative total received signal power) is compared for all relevant cells. Also, the path gain or CPICH level (CPICH Received Signal Code Power, RSCP) may additionally be determined. When determining the active set.

Assuming that a UE is connected to a first cell, cell A, and that the UE is gradually approaching a second cell, cell B, the quality of the measured reference signal, such as the CPICH Ec/No, of cell B will at some stage be within a specified window relative the best serving cell, cell A. This triggers an event and the UE sends a measurement report to the serving Radio Network Controller (RNC) that cell B is within range. In response to such a measurement report Cell B is added to the active set of this particular UE via an Active Set Update message transmitted from the RNC to the UE. Also, the cell B has been informed by the RNC that a link to the UE has to be established.

In FIG. 1 such a scenario is schematically depicted. Thus, in FIG. 1, the two links to the first and second cells, i.e. cell A and Cell B have equal path gain g0. Further it should be noted that the active set is determined based on the signal quality of the measured reference downlink signal. The following events may typically used to determine the active set:

A. A new cell has entered reporting range (used when there are room for yet another cell in active set)

B. A cell in active set has leaved reporting range

C. A new cell is better than a specified active set cell (used when active set is full)

D. A different cell is better than previously best cell in active set.

If the uplink and downlink path gains of the links to/from the two cells are the same, then the active set, despite only evaluated for the downlink, constitute a good set of cells also for the uplink However, if the uplinks and downlinks are different, and furthermore the downlinks from the two cells are different, the active set might be relevant for the downlink, but much less relevant for the uplink.

One such example is when the uplinks and downlinks are unbalanced, for example when low noise amplifiers are used in the uplink to compensate for feeder losses between the Radio Base Station RBS and the antenna. The RBS amplifier feeds the antenna via a feeder cable, which has a certain feeder cable loss. This can be significant, for example in some cases it may be as high as 10-12 dB. In the uplink, the signal is sent from the antenna down to the RBS via a feeder cable causing a similar loss. This could give a very weak signal at the RBS. To compensate for this loss the received signal is amplified by a low noise amplifier directly connected to the antenna. This amplifier is sometimes also referred to as Tower-mounted amplifier (TMA). An exemplary RBS and antenna configuration is illustrated in FIG. 2. In FIG. 2, the antenna 201 is connected to a TMA 203. The TMA receives signals from the Antenna 201 on a TMA Antenna port 207. The TMA 203 is further connected to a Radio Base Station (RBS) 205. The RBS 205 receives signals from the TMA via RBS port 207.

With a significant feeder loss in cell A, and a negligible loss in cell B, the point where the equal CPICH Ec/No from the two cells is shifted, and the perceived combined downlink feeder loss and path gain is lower at this point.

In FIG. 3 an illustrative example is shown. In the example shown in FIG. 3, the path gain is $(g_0+3$ dB$)-6$ dB from cell A including both path gain and feeder loss, and $g_0-3$ dB from cell B. However, for the uplink, the gain from this downlink mid point is $g_0+3$ dB to cell A, but only $(g_0-3$ dB$)$ to cell B. At this downlink mid point, there is probably very little use of cell B. This means that when moving from cell A to cell B, cell A will at some stage be removed from the active set since it becomes worse downlink-wise. However, at this stage, the uplink to cell A can still be relevant, and worth keeping.

The active set will in some cases be less relevant for the uplink There are however situations when it is more important to have a relevant active set uplink-wise. One such example is High Speed Packet Access (HSPA), where the High Speed—Downlink Shared Channel (HS-DSCH) is transmitted only from the best cell in the active set, i.e. the serving cell. The serving cell is typically determined to be the cell of the active set providing the best signal quality. On the other hand, the Enhanced Dedicated Channel (E-DCH) is received by all base stations, Node Bs, in the active set, the uplink data rate in a practical case might be limited by the non-serving cells in the active set, i.e. the cells of the active cell other than the serving cell.

According to the above, the HS-DSCH is hence only transmitted from the serving cell to the UE and it is therefore important that the cell providing the best down link conditions is the serving cell. Similarly, to obtain good conditions for the E-DCH it is important that the cell providing the best conditions in the up-link is among the cells forming the active set.

Hence, there exist a need for a method and a system that is able to provide an active set that is better suited for evolving radio communication systems and which is able to provide a relevant active set for the up-link of a cellular radio communication connection.

SUMMARY

It is an object of the present invention to overcome or at least reduce some of the problems associated with existing on methods for determining an active set.

It is another object of the present invention to provide a method and a device that is capable of providing a relevant active set for the up-link of a cellular radio system.

These objects and others are obtained by the method and system as set out in the appended claims. Thus, by forming an active set by determining the cell individual offsets (CIO) and signaling the cell individual offsets to the User Equipments (UE) an active set providing good characteristics for the uplink can be achieved.

The signaled cell individual offsets are used by the UE to add corrections to the measured reference signal measurement events, such as CPICH measurements before the event triggering. If the CIOs are set relative the unbalances, the active set will meet the uplink demands on the active set cells. Furthermore, the CIOs can be signaled dedicated, i.e. only to the HSPA-enabled UEs. By using CIOs for all measurements except change of best cell, i.e. event D as described above, it is possible to compile the active set with uplink-relevant cells and the best serving cell in the downlink.

BRIEF DESCRIPTION OF THE DRAWINGS

The present invention will now be described in more detail by way of non-limiting examples and with reference to the accompanying drawings, in which.

DETAILED DESCRIPTION

In accordance with the present invention a specific set of CIOs is formed. The CIO can be set according to any suitable algorithm using suitable input data. In addition the CIO may be set manually or as a manual override to a CIO set by an automated device. The specific set of CIOs can preferably be signaled dedicated to a subset of the UEs. By transmitting such a specific set of CIOs to some dedicated UEs an active set relevant for the uplink can be obtained. The remaining UEs, i.e. UE not in the receiving the set of specific CIO subset remain at a normal CIO setting. In one exemplifying embodiment, the specific set of CIO's is signaled dedicated to HSPA capable UEs whereas UEs not being HSPA capable maintains a normal CIO setting.

In another exemplifying embodiment, the specific set of CIOs is signaled dedicated to UEs with certain capabilities, for example EUL UE category 6, or capable of uplink 16 QAM.

Other capabilities that may be used to determine which UEs to signal the specific set of CIOs may be UEs capable of some type of modulation, UEs enabled to handle a specific radio configuration, UEs enabled to handle a certain bit rate or having some type of subscription.

In accordance yet another exemplifying embodiment, the specific set of CIO's is signaled to all UEs.

The construction of the specific set of CIO's is further preferably based on information related to unbalances in the uplink as compared to the downlink. As an example the feeder losses and TMA information can be collected from all cells.

Figure 1:
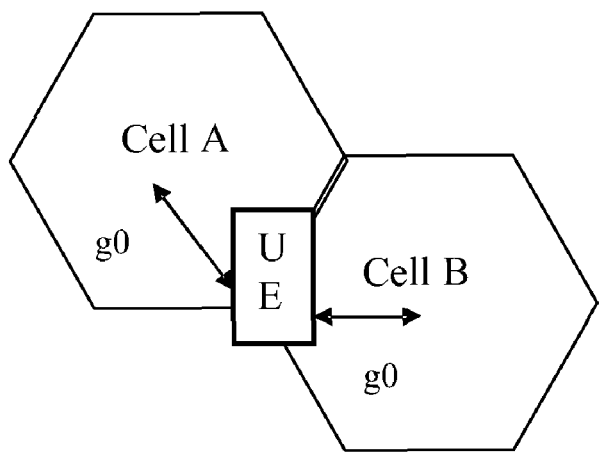
FIG. 1 is a view illustrating a UE with links set up to two different cells in accordance with a first exemplary system configuration.
Figure 2:
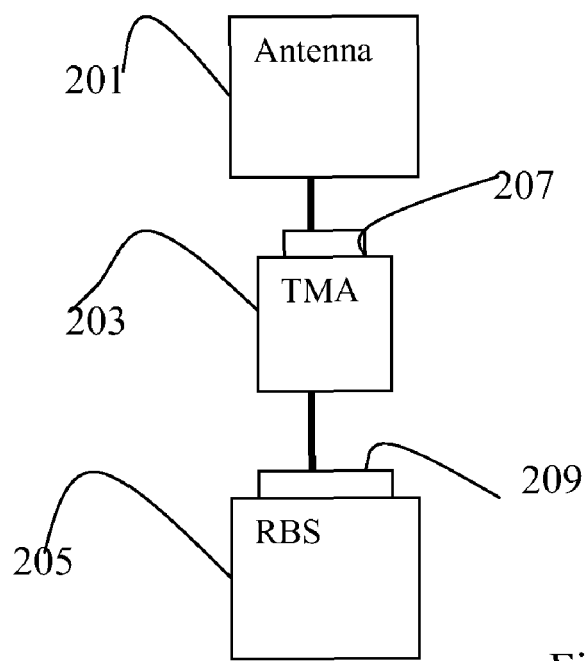
FIG. 2 is a view of an RBS and antenna configuration
Figure 3:
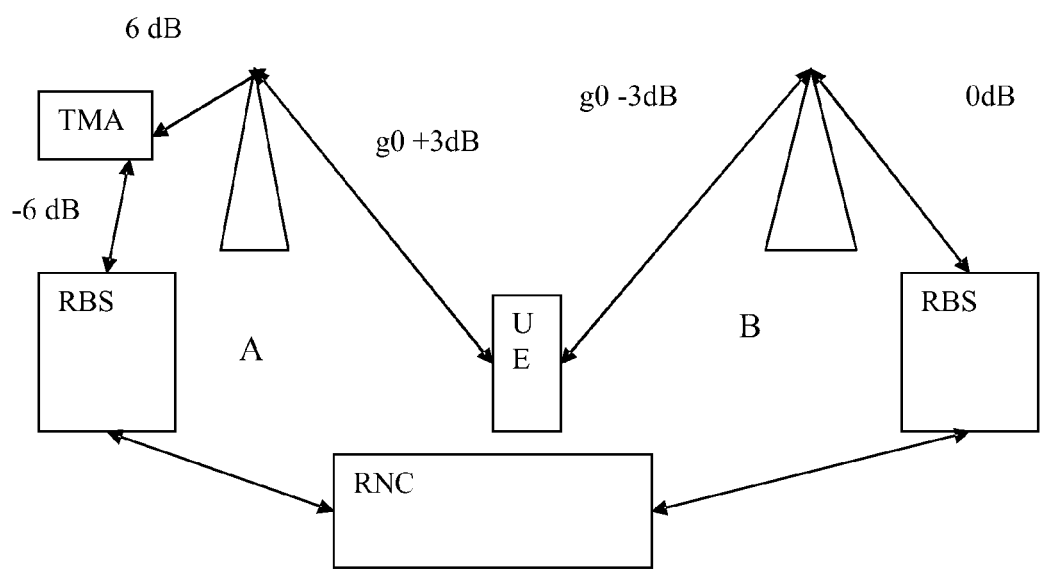
FIG. 3 is a view illustrating a UE with links set up to two different cells in accordance with a second exemplary system configuration
Figure 4:
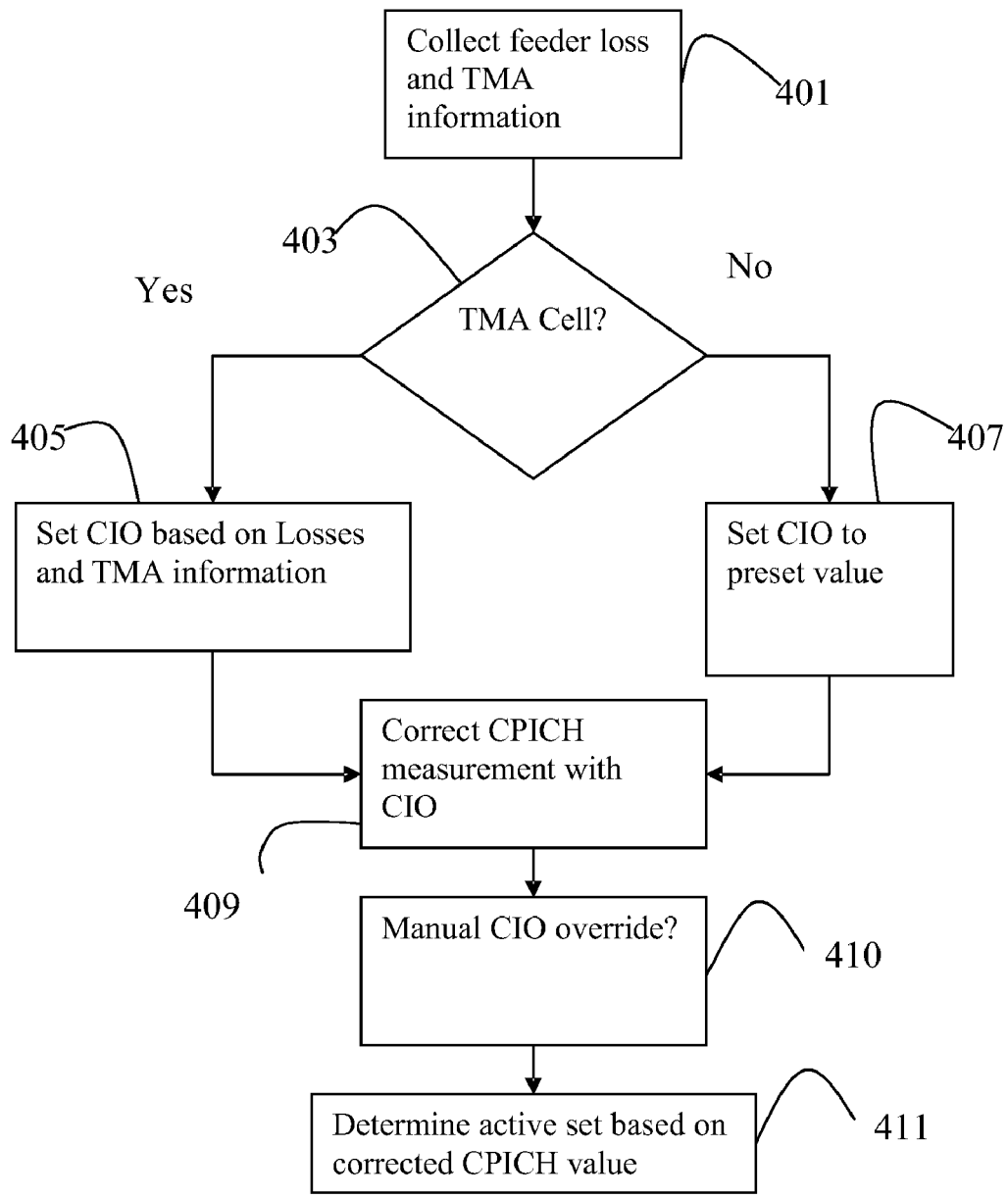
FIG. 4 is a flow chart illustrating determination of the active set for a UE.

In FIG. 4 a flowchart illustrating steps performed in a cellular radio system network, such as the system depicted in FIG. 3, when determining the active set for a particular UE connected to the cellular radio system.

First in a step 401, information related to information relevant to compensate the CPICH measurement with is collected. In particular information related to feeder losses and TMA information of all cells of a cellular radio system or a part thereof is collected. Next, in a step 403 cells associated with feeder losses or TMAs are identified. If a cell is associated with a feeder loss or a TMA, a CIO value for that cell is set to a value reflecting the feeder losses and/or TMA for that cell in a step 405. In accordance with another example, the set of CIO's can be set manually, or as an optional manual override to any automatic determination. If on the other hand, a cell is determined not to be associated with any feeder losses or TMA in step 403, the CIO value for that cell is set to a preset value in a step 407. The preset value set in step 407 may for example be set to zero. Thereupon, in a step 409, the CPICH is adjusted by an offset determined by the CIO value assigned in steps 405 and 407, respectively. If manual settings are applied, or a manual override is applied to the automatically determined values, they are assigned in a step 410. Finally in a step 411 the active set is determined based on a corrected reference signal measurement.

In accordance with one embodiment of the present invention the CIO values determined by the system is only transmitted to a subset of the UEs in the system. For example the CIO value may be transmitted to UEs having HSPA capabilities or some other capabilities. Moreover, the CIO value for a cell may in accordance with one embodiment only be transmitted to a UE if the CIO is above or below some predetermined threshold value. In particular no CIO value for a particular may be transmitted to a UE in case the CIO value is zero.

In accordance with one exemplary embodiment the CIO setting when the TMA is available is set to:

CIO=min(feeder loss in dB, TMA max gain in dB)

and zero for cells without TMA.

In another exemplary embodiment the CIO setting is according to another suitable algorithm based on data available in the system, uplink as well as downlink, configuration data as well as measured live data. In yet another exemplary embodiment, the CIO setting is manual, or as a manual override to any setting determined previously in the process.

By using CIO as described above for all triggering events except change of best cell, it is possible to keep the best serving cell downlink-wise in the active set, which is important from an HSDPA performance point of view. To achieve this, the RNC will use the change of best cell reporting to update HSDPA serving cell.

When using the specific set of CIOs to HSPA connections, it can also be beneficial to increase the handover margin. This will enable good uplink inter-cell interference control by the use of relative grants to relative many prospective interferers.

Similarly, the adaptation of the active set to the uplink could be achieved by CPICH adjustments. The levels at the RBS port 209 can then be adapted by the same amount as CIO defined above. This will give the same CPICH power for all cells at the port 207. Then, the only option is to use this for all users and connections. This, however, would be at the cost of a capacity loss. In addition, there is a risk that the HSDPA serving cell is different from the best downlink cell.

With an active set adapted to the uplink, the uplink RRM will work better, since the relative grants from the EUL scheduler will most likely reach disturbing users to a greater extent than if the active set would be adapted to the downlink. Furthermore, in the case of HSPA, the uplink macro diversity gain could be of higher importance since the downlink transmission is only from best serving cell. Therefore, it is more relevant to adapt the active set to the uplink.

The invention claimed is:

1. A method of determining an active set for a mobile station enabled to connect to multiple cells of a cellular radio system, where the mobile station performs measurements on a reference signal transmitted from cells of the cellular radio system, the method comprising:
- determining cell individual offsets (CIO) for a number of cells;
- signaling the cell individual offsets to the mobile station;
- adding corrections to the reference signal measurements based on the cell individual offsets (CIO), forming a corrected reference signal measurement;
- determining the active set based on the corrected reference signal measurement,
- wherein the cell individual offset for a particular one of the cells is determined based on a measure of a gain unbalance between an uplink and a downlink communication path between the mobile station and the particular cell.

2. The method according to claim 1, the method further comprising
- determining that a mobile station has a predetermined capability;
- transmitting the cell individual offset for the particular cell to the mobile station, responsive to the determination that the mobile station has the predetermined capability.

3. The method according to claim 2, where the cell individual offset for the particular cell is transmitted to a mobile station if in response to determining that the mobile station is High Speed Packet Access (HSPA) enabled.

4. The method according to claim 1, the method further comprising:
- determining that a mobile station is capable of a particular type of modulation; and
- transmitting the determined cell individual offset for the particular cell in response to the determination that the mobile station is capable of the particular type of modulation.

5. The method according to claim 1, where the cell individual offset is set to zero for all cells without Tower Mounted Amplification (TMA).

6. The method according to claim 1, where the method further comprises:
- when a CIO offset value is used, increasing a handover margin.

7. The method according to claim 1, where the reference signal is transmitted on a Common Pilot Channel (CPICH).

8. A node for determining an active set for a mobile station enabled to connect to multiple cells of a cellular radio system, where the mobile station performs measurements on a reference signal transmitted from cells of the cellular radio system, the node comprising:
- a component configured for:
  - determining cell individual offset (CIO) for a particular one of the cells;
  - signaling the cell individual offset to the mobile station;
  - receiving a corrected reference signal measurement report based on the cell individual offset (CIO), forming a corrected reference signal measurement from the mobile station; and
  - determining the active set based on the corrected reference signal measurement report,
  - wherein the cell individual offset is determined based on a measure of a gain unbalance between an uplink and a downlink communication path between the mobile station and the cell.

9. The node according to claim 8, wherein the component is further configured for:
- determining that a mobile station has a predetermined capability; and
- transmitting the cell individual offset for the particular cell to the mobile station, responsive to the determination that the mobile station has the predetermined capability.

10. The node according to claim 9, wherein the component is further configured to transmit the determined cell individual offset for the particular cell to the mobile station if in response to determining that the mobile station is High Speed Packet Access (HSPA) enabled.

11. The node according to claim 8, wherein the component is further configured for:
- determining that a mobile station is capable of a particular type of modulation; and
- transmitting the determined cell individual offset for the particular cell in response to the determination that the mobile station is capable of the particular type of modulation.

12. The node according to claim 8, wherein the component is further configured for setting the cell individual offset to zero for all cells without Tower Mounted Amplification (TMA).

13. The node according to claim 8, wherein the component is further configured for increasing a handover margin when a CIO offset value is used.

14. The node according to claim 8, where the reference signal is transmitted on a Common Pilot Channel (CPICH).

* * * * *

UNITED STATES PATENT AND TRADEMARK OFFICE
CERTIFICATE OF CORRECTION

PATENT NO. : 8,401,544 B2
APPLICATION NO. : 12/676463
DATED : March 19, 2013
INVENTOR(S) : Fried et al.

Page 1 of 2

It is certified that error appears in the above-identified patent and that said Letters Patent is hereby corrected as shown below:

On the Title Page, in Item (75), under "Inventors", in Column 1, Line 2,
delete "Linkoping" and insert -- Linköping --, therefor.

On the Title Page, in Item (56), under "OTHER PUBLICATIONS", in Column 2, Line 2,
delete "Radion" and insert -- Radio --, therefor.

On the Title Page, in Item (56), under "OTHER PUBLICATIONS", in Column 2, Line 5,
delete "Radion" and insert -- Radio --, therefor.

In the Specifications

In Column 1, Line 60, delete "uplink" and insert -- uplink. --, therefor.

In Column 2, Line 15, delete "207." and insert -- 209. --, therefor.

In Column 2, Line 32, delete "uplink" and insert -- uplink. --, therefor.

In Column 3, Line 42, delete "CIO's" and insert -- CIOs --, therefor.

In Column 3, Line 55, delete "CIO's" and insert -- CIOs --, therefor.

In Column 3, Line 56, delete "CIO's" and insert -- CIOs --, therefor.

In Column 4, Line 6, delete "CIO's" and insert -- CIOs --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,401,544 B2

In the Claims

In Column 5, Line 18, in Claim 2, delete "comprising" and insert -- comprising: --, therefor.

In Column 6, Line 26, in Claim 10, delete "if in" and insert -- in --, therefor.